Jan. 19, 1960   D. V. RIDGEWAY   2,922,153
MOUNTING OF CATHODE RAY TUBES
Filed Aug. 28, 1957

Inventor
*Denis V. Ridgeway*
By
*Holcombe, Wetherill & Brisebois*
Attorneys

United States Patent Office 2,922,153
Patented Jan. 19, 1960

2,922,153

MOUNTING OF CATHODE RAY TUBES

Denis V. Ridgeway, Cambridge, England, assignor to Pye Limited, Cambridge, England, a British company Application August 28, 1957, Serial No. 680,816

Claims priority, application Great Britain August 30, 1956

5 Claims. (Cl. 340—367)

The present invention relates to methods and means for mounting cathode ray tubes particularly for projection television systems. Projection television systems normally employ an optical system such as the well-known "Schmidt" system and in this system the position of the luminous face of the cathode ray tube relative to the positions of the mirror and the refractor or corrector plate are quite critical, so much so that if the cathode ray tube were to be moved through a distance of the order of only one or two thousandths of an inch this would be sufficient to ruin a projected picture, especially if the cathode ray tube is one of a system of tubes used for example in colour projection arrangement.

In the past cathode ray tubes have been mounted in a suitable cradle placed around the neck of the tube and usually towards the end where the electron gun is situated such an arrangement being the most convenient because the clamp can be situated as far as possible from the high voltage terminal on the tube and away from the focussing and deflection coils. This known arrangement however suffers from the disadvantage that the tube face is liable to become out of position either due to thermal expansion of the tube itself under operating conditions or alternatively due to mechanical shock due to the relative distance of the luminous screen from the point of support.

Some of the cathode ray tubes used nowadays for projection purposes have ridges or flanges provided in the glass that forms the conical portion of the tube between its neck and its screen. These flanges serve to increase the surface leakage distance between the high voltage terminal referred to above and the neck of the tube. The importance of maintaining good insulation at this part of the tube will be apparent bearing in mind that voltages of the order of 50–80 kv. are commonly employed.

According to the invention these flanges are utilised in conjunction with a suitable clamp to hold the tube in position.

Figure 1:
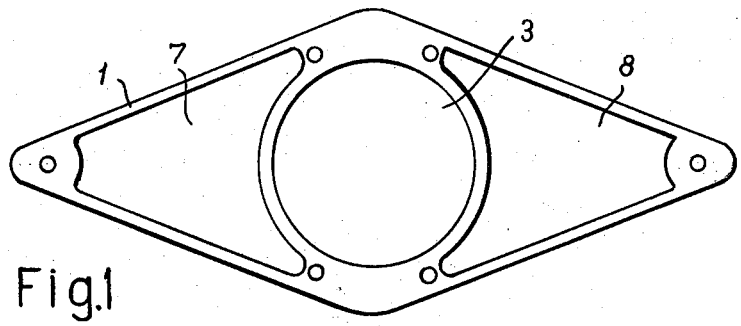
Figure 2:
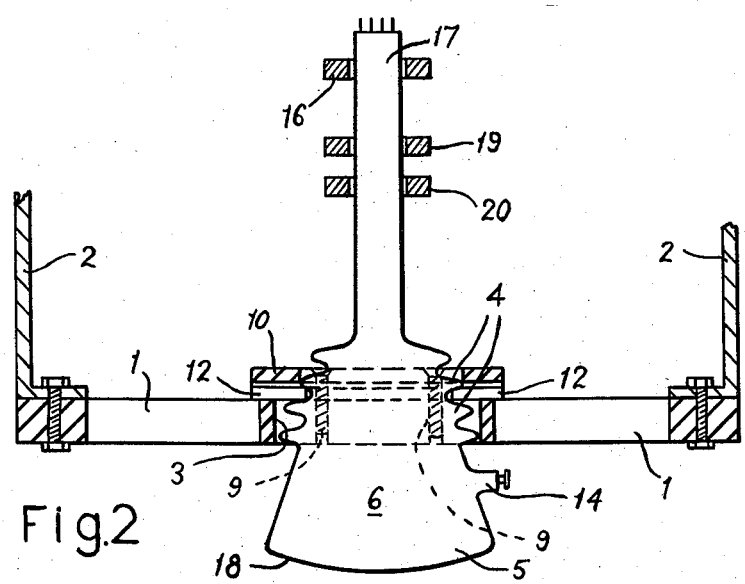
Figure 3:
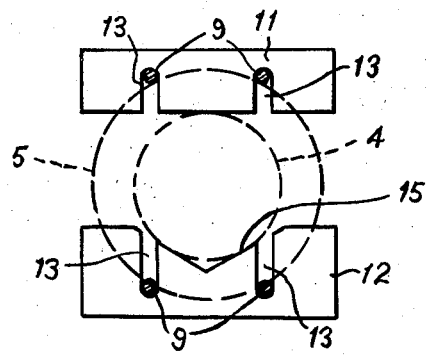

In order that the invention may be more clearly understood, reference will now be made to the accompanying drawings, which show one particular embodiment thereof by way of example only, and in which:

Fig. 1 shows a plan view of a bridge member used in the arrangement of the invention, Fig. 2 shows a horizontal section through a general arrangement, including the bridge member, and Fig. 3 shows a detail of the clamping members viewed from one end of the tube.

Figure 1 shows a bridge member 1 which is made from insulating material, preferably of the material known under the registered trademark "Micalex", and is fastened at its two extremities by suitable bolting means as shown to a support such as the framework of a Schmidt optical system partly illustrated at 2. It will be understood that the attachment of the bridge member to its support may take any desired form and may include means for effecting positional adjustment between the support and the bridge member. Since such expedients are well known they have not been illustrated. The optical system is not illustrated in the drawings so as to preserve the simplicity thereof. The bridge member 1, since it is specifically intended to lie in the path of the optical beam between the mirror and the corrector plate is constructed so that it presents as little area as possible to the beam, the necessary strength being obtained by making the member fairly wide in the direction of the beam. The member 1 has an aperture 3 which is sufficiently large to enable the ridges or flanges 4 (Fig. 2) around the conical portion 5 of the cathode ray tube 6 to pass through it without restriction. The bridge member is also further apertured at 7 and 8 (Fig. 1) to reduce the area thereof. Thus, the bridge member could also be referred to as a locating spider. Mounted on the bridge member 1 and secured thereto by screws of insulating material 9 is a cylindrically shaped washer 10 with a cylindrical hole therein also sufficiently large to pass over the ridges or flanges 4 without obstruction. Between the washer 10 and the bridge member 1 are located two clamping members 11 and 12 one on each side of the tube as shown more particularly in Fig. 3. These members 11 and 12 are sufficiently thin to be inserted between the flanges on the tube. Apertures or slots 13 are provided in the members 11 and 12 which have a sufficient size to allow them to move freely about the clamping screws when such screws have been loosened, the amount of movement being such that in the extreme positions of the members 11 and 12 the flanges 4 of the tube may pass unrestricted through the whole clamp. For this reason it is preferred that the openings 13 be slots. The high voltage terminal of the cathode ray tube is shown at 14. As can be seen more particularly in Fig. 3, the lower member 12 is provided with a V-shaped recess 15 to locate the tube 6. Fig. 3 shows only two members 11 and 12 and their relationship to the tube 6 with its conical portion 5 and ridges or flanges 4.

To mount the tube 6 in the arrangement, the clamping screws 9 are loosened so that the members 11 and 12 may move freely and these members are supported e.g. in the hand so that the cathode ray tube 6 can be passed through the aperture 3 in the bridge member 1 towards the clamping member 10, 11 and 12. The tube 6 is then pushed through the clamp until it is in the required position relative to the optical system. Actually this position need only be approximately determined by the clamping arrangement because fine adjustment of the position of the tube is obtained by movement of the bridge member 1 as a whole in relation to the support 2 by any convenient means such as micrometer screws or the like secured to sub-bracket assemblies (not shown). In Fig. 2 the tube 6 is, for convenience, not shown in section. After the tube has been placed in its approximate position the two members 11 and 12 are brought together manually so that they enter between two ridges or flanges 4 on the tube 6 at opposite sides thereof. The clamping screws 9 are then tightened bringing the washer 10 gradually into engagement with the members 11 and 12 and holding them securely against the bridge member 1. Since the whole clamp is made from insulating material it can be positioned quite closely to the high voltage terminal 14 without any disadvantage and it is only a short distance from the fluorescent screen the position of which is so critical as mentioned above. If it be desired, axial support may also be arranged at the other end of the tube such as the collar 16 around the neck 17 to counter any mechanical shocks that may occur, but such support does not hold the tube in any focussing relationship with the optical system and thermal expansion can therefore take place without affecting the positioning of the fluorescent screen relative to the optical system thereof. The loose collar 16 may be secured to a supporting frame (not shown).

Due to the proximity of the clamp to the high voltage terminal 14 it is advisable to remove all sharp corners from the structure so as to avoid abrupt changes in the dielectrics and to avoid corona taking place. The insulating clamping members 10, 11 and 12 may be made from the material known under the registered trademarks "Micalex" or "Bakelite," or similar insulating materials and the insulating screws may be made of the material known under the registered trademark "Tufnol."

The invention thus provides an arrangement that holds the tube near the screen end 18 for stability of optical focus. This is useful in colour and other television projection systems where all dimensions depend on the stability of location of the screen end.

Deflector and focus coils 19 and 20 are free to slide on the tube neck 17 so that the glass neck does not bind or touch the cores. Any movement of the coils for the adjustment of electrical parameters will thus not affect the optical adjustments already set up.

The invention provides an arrangement in contradistinction to known arrangements in which the tube is drawn into the coils by the clamp. For the present invention there is no fixed relationship at all between the coils and the tube.

I claim:

1. An arrangement for mounting a cathode ray tube that is provided with ridges in the tube envelope between the neck portion and the screen portion thereof, said arrangement comprising a clamping member divided into a plurality of parts severally engageable between two adjacent ridges on said tube envelope, a bridge member having an aperture for surrounding the largest diameter of said ridges on said tube envelope, a washer member having a cylindrical hole therein to pass over at least some of said ridges, and fastening means passing through all said three members to secure them together about said ridges on said tube envelope.

2. An arrangement for mounting a cathode ray tube that is provided with ridges in the tube envelope between the neck portion and the screen portion thereof, said arrangement comprising a clamping member divided into a plurality of parts severally engageable between two adjacent ridges on said tube envelope, a bridge member having an aperture for surrounding the largest diameter of said ridges on said tube envelope, a washer member having a cylindrical hole therein to pass over at least some of said ridges, said bridge member, said clamping member and said washer member being made from insulating material, fastening means of insulating material passing through all said three members to secure them together about said ridges on said tube envelope, and means for securing said bridge member to a support.

3. An arrangement for mounting a cathode ray tube that is provided with ridges in the tube envelope between the neck portion and the screen portion thereof, said arrangement comprising a clamping member divided into a plurality of parts severally engageable between adjacent ridges on said tube envelope, an elongated bridge member having an aperture for surrounding the largest diameter of said ridges on said tube envelope and wings projecting on two opposed sides thereof, a washer member having a cylindrical hole therein to pass over at least some of said ridges, said bridge member, said clamping member and said washer member being made from insulating material, and fastening means of insulating material passing through all said three members to secure them together about said ridges on said tube envelope, said wings being apertured.

4. An arrangement for mounting a cathode ray tube that is provided with ridges in the tube envelope between the neck portion and the screen portion thereof, said arrangement comprising a clamping member divided into a plurality of parts severally engageable between adjacent ridges on said tube envelope, a first washer member having an aperture for surrounding the largest diameter of said ridges on said tube envelope, a second washer member having a cylindrical hole therein to pass over at least some of said ridges, and fastening means passing through all said three members to secure them together about said ridges on said tube envelope, and two pairs of arms extending in opposite directions from said first washer member, each pair of said arms meeting at a point remote from said first washer member but in substantially the same plane.

5. An arrangement for mounting a cathode ray tube that is provided with ridges in the tube envelope between the neck portion and the screen portion thereof, said arrangement comprising a clamping member divided into a plurality of parts severally engageable between adjacent ridges on said tube envelope, a first washer member having an aperture for surrounding the largest diameter of said ridges on said tube envelope, a second washer member having a cylindrical hole therein to pass over at least some of said ridges, said clamping member and said washer members being made from insulating material, fastening means of insulating material passing through all said three members to secure them together about said ridges on said tube envelope, and two pairs of arms of insulating material integral with said first washer member and extending in opposite directions therefrom, each pair of said arms meeting at a point remote from said first washer member but in substantially the same plane.

References Cited in the file of this patent

UNITED STATES PATENTS

| | | |
|---|---|---|
| 2,471,154 | Keim | May 24, 1924 |
| 2,646,958 | Coykendall | July 28, 1953 |